United States Patent
Reichl et al.

(10) Patent No.: US 6,433,538 B1
(45) Date of Patent: Aug. 13, 2002

(54) MEASURING DEVICE FOR CONTACTLESS DETERMINATION OF AN ANGLE OF ROTATION BETWEEN A STATOR AND A ROTOR

(75) Inventors: Asta Reichl, Stuttgart; Thomas Klotzbuecher, Rudersberg; Tilman Gauger, Albstadt, all of (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/355,475
(22) PCT Filed: Oct. 12, 1998
(86) PCT No.: PCT/DE98/03003
  § 371 (c)(1),
  (2), (4) Date: Jul. 30, 1999
(87) PCT Pub. No.: WO99/30111
  PCT Pub. Date: Jun. 17, 1999

(30) Foreign Application Priority Data

Dec. 4, 1997 (DE) .......................................... 197 53 777

(51) Int. Cl.⁷ ................................................. G01B 7/30
(52) U.S. Cl. ................................ 324/207.25; 324/207.2
(58) Field of Search ....................... 324/207.12, 207.13, 324/207.2, 207.21, 207.22, 207.25, 174; 338/32 R, 32 H

(56) References Cited

U.S. PATENT DOCUMENTS 6,130,535 A * 10/2000 Herden et al. ........... 324/207.2

FOREIGN PATENT DOCUMENTS

DE  196 34 281 A1  2/1998

* cited by examiner

Primary Examiner—Jay Patidar
(74) Attorney, Agent, or Firm—Michael J. Striker

(57) ABSTRACT

A measuring device for contactless determination of an angle of rotation between a stator and a rotor has at least one magnetic-field-sensitive element located in said at least one air gap in the stator; at least one segment of at least one permanent magnet disposed in the rotor so that a direction of polarization of the permanent magnet is oriented in an axial direction of the rotor, the stator being constructed of multiple parts at least one of which parts has no magnetically conductive connection with the other parts, said permanent magnet being formed at a maximum measurement signal it is located under only a first part of the stator, and at another maximum measurement signal it is located only under a second part of the stator.

13 Claims, 5 Drawing Sheets

MEASURING DEVICE FOR CONTACTLESS DETERMINATION OF AN ANGLE OF ROTATION BETWEEN A STATOR AND A ROTOR

PRIOR ART

The invention is based on a measuring device for contactless determination of an angle of rotation as generically defined by the preamble to the independent claims. From published French Patent application FR 90 15 223, a measuring device is known in which a stator and a rotor are moved relative to one another. There is a small air gap between the stator and the rotor, each of which is made of magnetically conductive material. A first annular permanent magnet, which is radially polarized, is disposed in the rotor over a length of 180°. In the remaining region of the stator, also encompassing 180°, there is a second annular permanent magnet of opposite polarization. The stator also has two diametrically opposed air gaps. In at least one of these air gaps, there is a Hall sensor. In the rotary motion of the rotor, relative to the stator, the intensity of the magnetic field passing through the Hall sensor changes. The linear measurement range of the measurement signal thus generated is limited to a magnitude of ±75°, however. This linear measurement range also has a change of sign. This change of sign could possibly be corrected, at some expense, in an adjacent electrical circuit.

From German published, non-examined Patent Application DE-OS 196 34 381.3, published after the filing date of the present application, a sensor is also known that is disposed in three planes, one above the other. The rotor forms the middle plane and comprises the carrier plate for a permanent magnet. The carrier plate itself comprises magnetically nonconductive material, so that the magnetic flux passes via the other two planes, that is, the stator, and is controlled with the aid of two spacers, which are disposed between the two planes of the stator. With this sensor, a relatively wide angular range can be measured without a change of sign, but it is not suitable for measurements over 180°.

ADVANTAGES OF THE INVENTION

The measuring device of the invention for contactless determination of an angle of rotation, having the characteristics of the body of the independent claim, has the advantage over the prior art that the sensor makes it possible to determine an angle of rotation of over 200°. The virtually linear measurement line has no change of sign. The zero point of the induction is equal to the zero point of the angle measurement. Because of the structural arrangement of the flux conductors and the air gaps, the measurement range can be varied to over 240°. If the measurement gap is curved, then the permanent magnet can be smaller than the angle to be characterized. If the spiral permanent magnet system is smaller than the angle to be characterized, then flux elements for example need not be a full circle or have other similar complete shapes. Furthermore, the drive shaft need not be disposed at the center of the sensor.

Advantageous refinements of and improvements to the measuring device defined by the independent claim are possible with the provisions recited in the dependent claims.

DRAWING

Exemplary embodiments of the invention are shown in the drawing and explained in further detail in the ensuing description.

DESCRIPTION OF THE EXEMPLARY EMBODIMENTS

Figure 1:
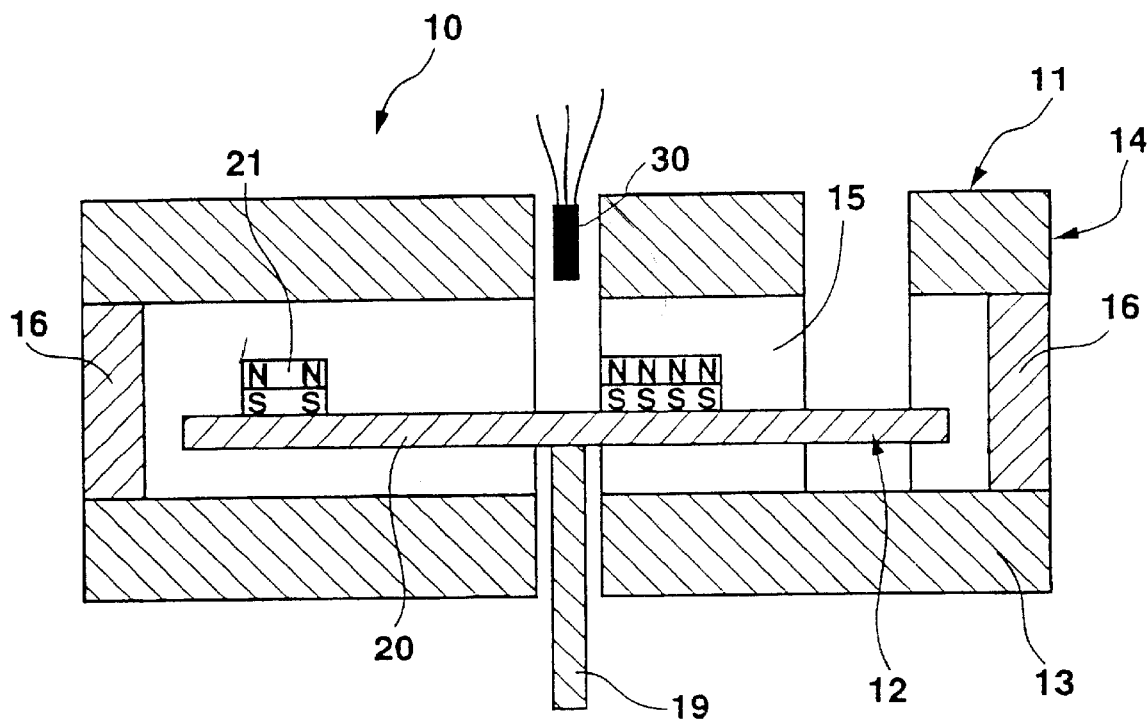
FIG. 1 shows a longitudinal section in the direction I—I of FIG. 2 through a first exemplary embodiment.
Figure 2:
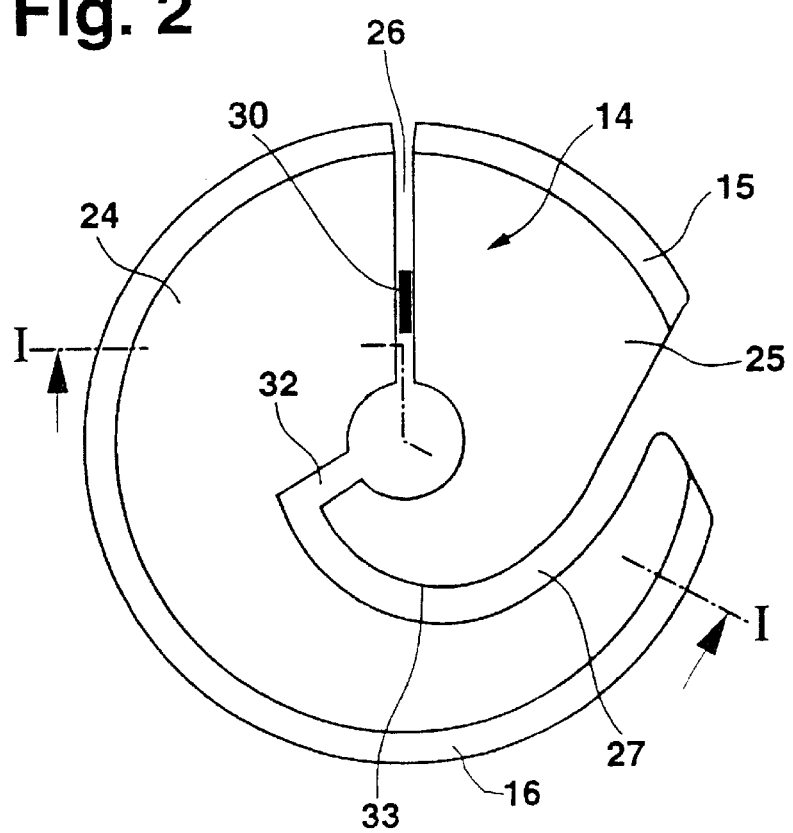
FIGS. 2 and 3 are a plan view from above and below, respectively.
Figure 3:
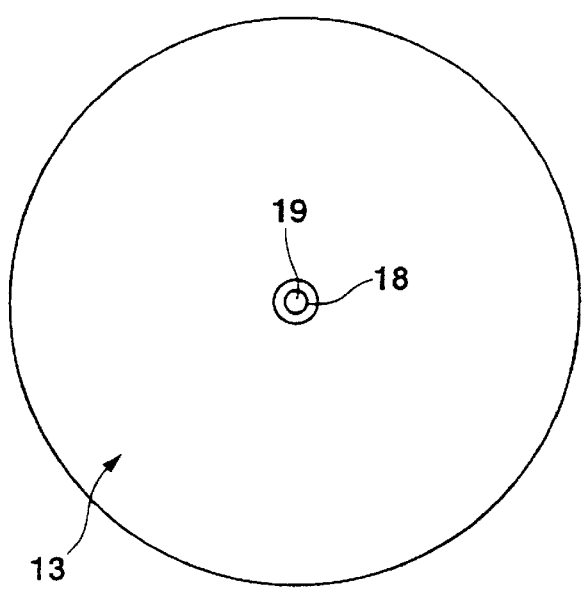
Figure 4:
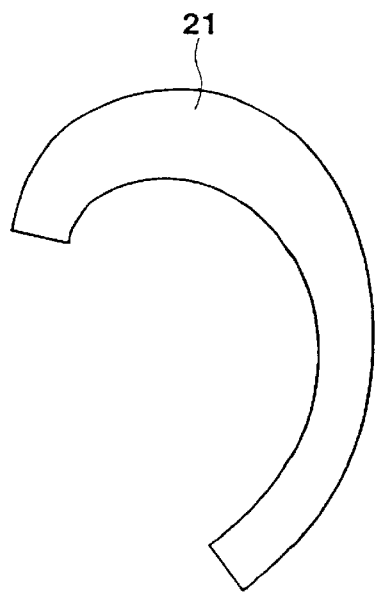
FIG. 4 shows the shape of a permanent magnet.
Figure 5:
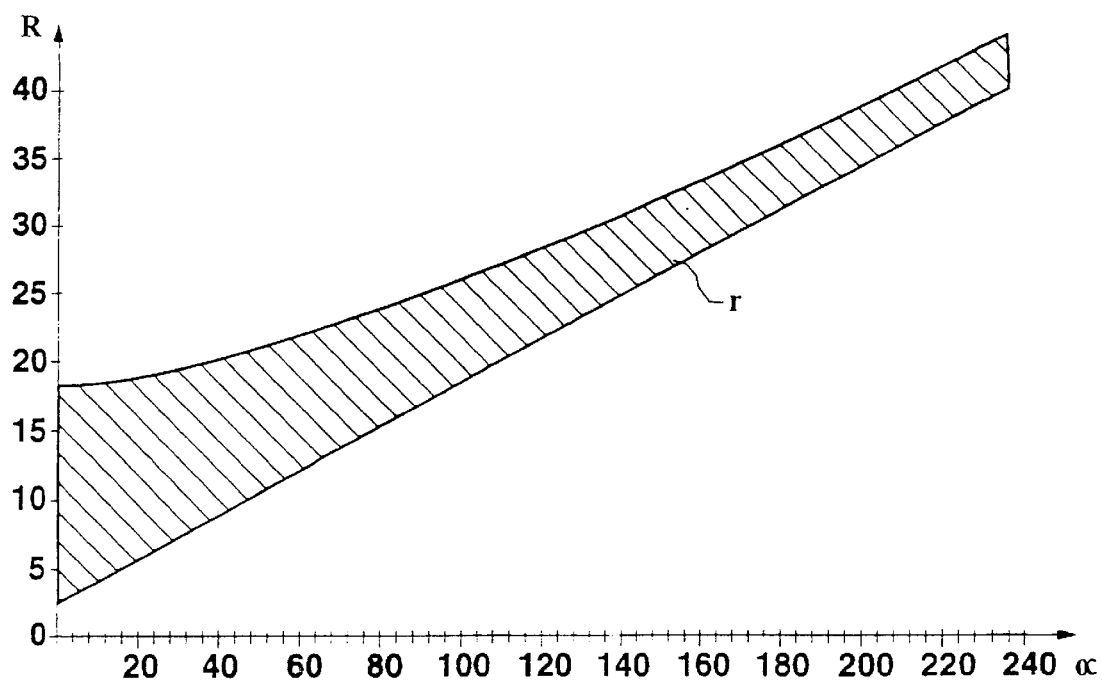
FIG. 5 shows the associated view of the spiral of the permanent magnet over the angle alpha.
Figure 10:
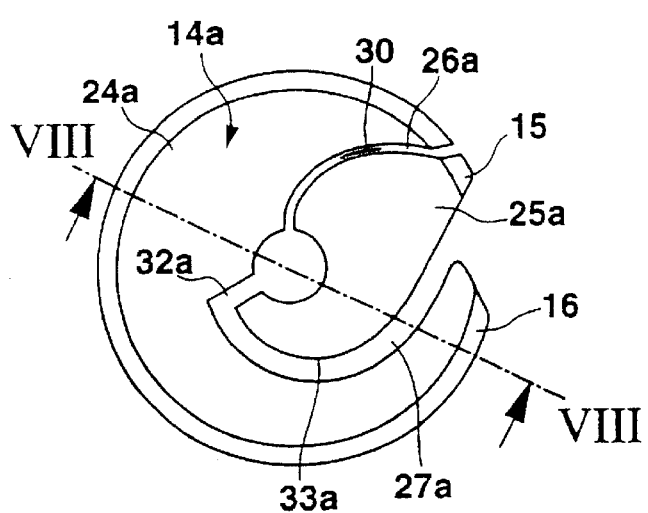

FIG. 10 shows a sensor 10, which comprises a stator 11 and a rotor 12. The stator has a bottom plate 13 and a top plate 14, which are separated by two spacers 15, 16. As can be seen in greater detail in FIG. 3, the bottom plate 13 has a bore 18, through which the shaft 19 of the rotor 12 protrudes. The shaft 19 can be connected to a component, not shown, whose rotary motion is to be determined. The carrier plate 20 of the rotor 12 is secured centrally on the shaft 19 and comprises magnetically nonconductive material. Located on the carrier plate 20 is a permanent magnet 21, whose shape is shown in further detail in FIG. 4. The direction of polarization of the permanent magnet 21 is oriented parallel to the shaft 19. The top plate 11 of the sensor 10 is shown in further detail in FIG. 2 and comprises the two segments 24 and 25. The two segments 24, 25 are separated from one another by a gap 26 and a second gap 27. The gap 26 extends in the radial direction straight from the center point of the top plate 14 to the outer circumference. A magnetic-field-sensitive element 30 is disposed in the gap 26. This may for instance be a field plate, a magnet transistor, magnetoresistive elements, or a Hall element. What is important in this respect is that the magnetic-field-sensitive element have the most linear possible dependency of its output signal on the magnetic induction B. Instead of one element, a plurality of elements may also be employed, for the sake of redundant measurement (safety measurement). The gap 27 has a radially outward-oriented region 32, which begins at the center point of the top plate 11 and forms an angle of approximately 120° with the gap 26, and an adjoining curved region 33, which extends as far as the circumference. The two gaps 26 and 27 should be adapted to one another in such a way that the magnetic flux of the permanent magnet 21 extends as completely as possible only across the gap 26, while the gap 27 virtually prevents any magnetic flux. The gap 27 is wider than the gap 26. Instead of being filled with air, the gap 27 may also be filled with other magnetically nonconductive material. These two segments 24, 25 must be disposed in such a way that each segment is at least as large as the angular segment of the permanent magnet 21. This means that if the permanent magnet is larger than 180°, then the two segments 24, 25 are nested one inside the other, as shown in FIG. 2. It is also important that the air gap 27 and the shape of the permanent magnet 21 be adapted to one another in such a way that the permanent magnet 21, during the entire rotary motion, does not overtake the gap 27. The shape of the permanent magnet 21 is shown in FIG. 4. It can be seen that one end of the permanent magnet must have a lesser width than the other end of the permanent magnet 21. It must also have the form of a spiral or an arc of a circle. The shape of the permanent magnet is shown in further detail in the graph in FIG. 5. This shows the course of the radius over the particular angular range to be determined. One side of the permanent magnet should have a linear slope r. The other side of the permanent magnet then has a radius R, which can be calculated by the following equation:

$$R(\alpha) = \sqrt{\left(\frac{\Delta A \cdot 360°}{\Delta(\alpha) \cdot \pi}\right) + r^2}.$$

A = area of the permanent magnet
α = the angle of rotation

This formula is based on the assumption of a constant thickness of the permanent magnet over its length.

The permanent magnet 21 can be made not only from the known magnetic materials but also from plastic-bonded rare earth magnets (such as $Sm_2Co_{17}$).

In the stator 11, the two segments 24, 25 of the top plate 14, the bottom plate 13 and the spacer 16 comprise magnetically conductive and in particular soft magnetic material. The second spacer 15, conversely, comprises non-magnetically conductive material. The soft magnetic spacer 16 is joined here to the bottom plate 13 and to the larger of the two segments of the top plate 14. The magnetically nonconductive spacer 14 is disposed between the bottom plate 13 and the smaller segment 25. Depending on how the sensor is built into a suitable housing, the spacer 14 can also comprise air.

Figure 6:
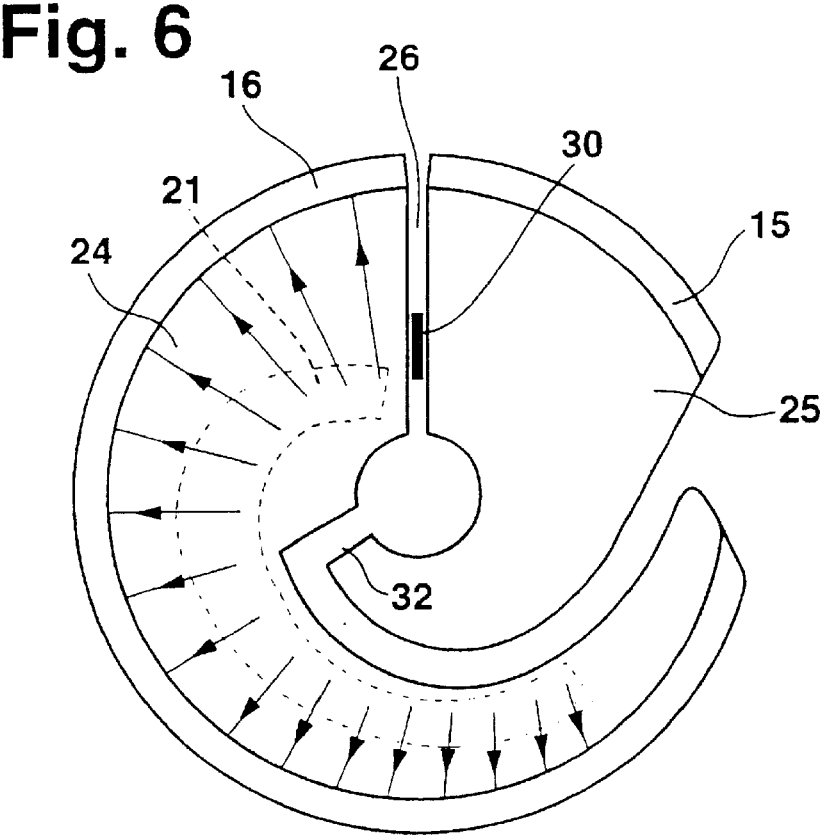
FIGS. 6 and 7 show the position of the permanent magnet and the respective magnetic flux at a minimum and maximum angle.
Figure 7:
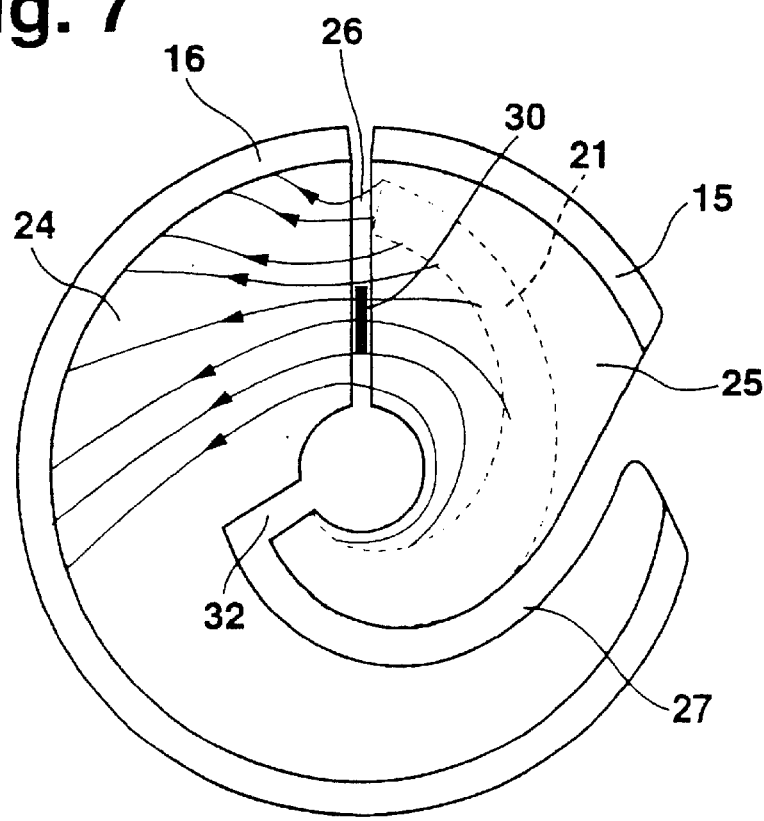

In FIGS. 6 and 7, the disposition of the permanent magnet is shown relative to the two segments 24, 25 for the smallest possible angle (FIG. 6) and the largest possible angle (FIG. 7). The magnetic flux in each case is also shown in these drawings. The direction of rotation of the permanent magnet is clockwise. It can be seen from FIG. 6 that at an angle of rotation of zero degrees, the permanent magnet 21 is located entirely under the segment 24. The magnetic flux flows entirely from the permanent magnet 21 into the segment 24 across the spacer 16 and, not shown in FIG. 6, across the bottom plate 13 back to the permanent magnet 21. At the angle of 0°, no magnetic flux across the gap 26 and thus through the magnetic-field-sensitive element 30 is possible.

At full deflection of the sensors, or in other words a maximum angle of rotation, as shown in FIG. 7, the permanent magnet is located entirely under the segment 25. The wider end of the permanent magnet 21 protrudes toward the region 32 of the gap 27. The length of the region 32 of the gap 27 should thus be adapted to the width of the permanent magnet 21 on this end. It can be seen from FIG. 7 that the magnetic flux from the permanent magnet 21 flows via the segment 25, the gap 26, and the magnetic-field-sensitive element 30 dispose there, to the segment 24. The magnetic lines also pass via the spacer 16 and the bottom plate 13 back to the permanent magnet 21. The gap 27 prevents any flow of the magnetic lines in its region from the segment 24. All the magnetic lines have to pass via the gap 26 and the magnetic-field-sensitive element 30. In this arrangement, a linear course of the magnetic induction B in the magnetic-field-sensitive element 30 is obtained over an angular range of up to 240°, and there is no change of sign in the linear measurement curve.

Figure 8:
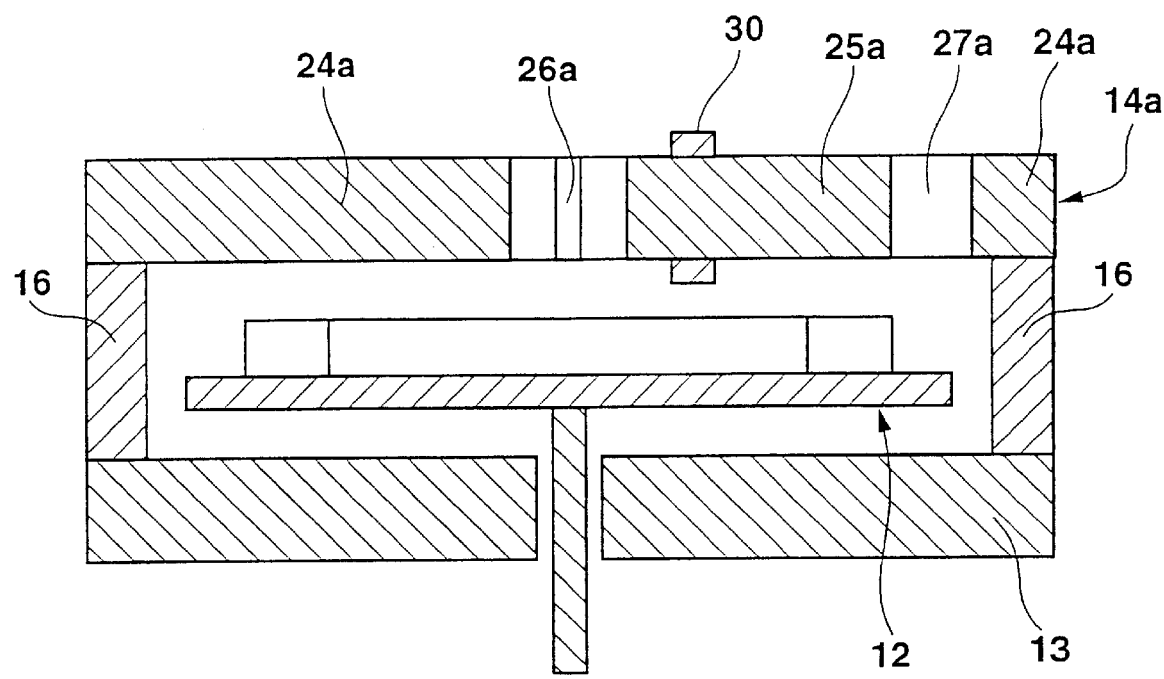
FIG. 8 shows a longitudinal section in the direction VIII—VIII of FIG. 10 through a further exemplary embodiment.
Figure 9:
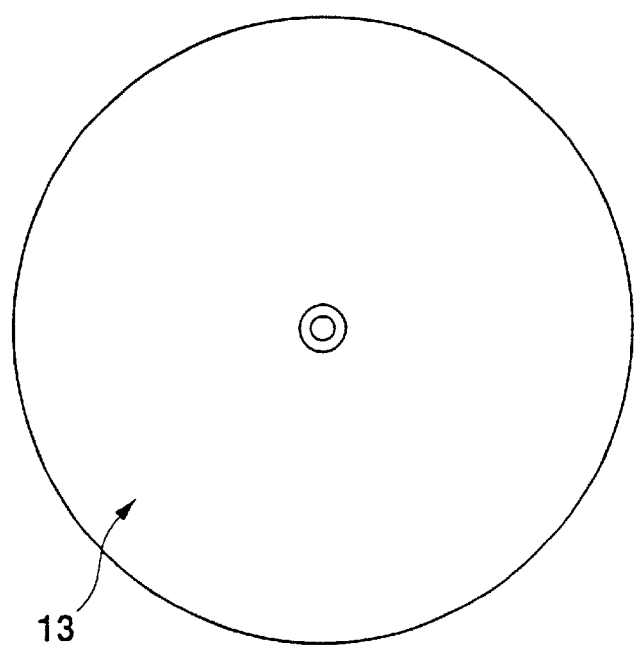
FIGS. 9 and 10 show a bottom view and a top view on this exemplary embodiment.
Figure 11:
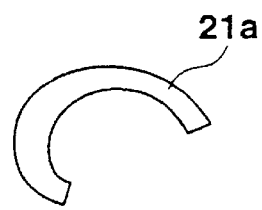
FIG. 11 shows the shape of the permanent magnet for this exemplary embodiment.
Figure 12:
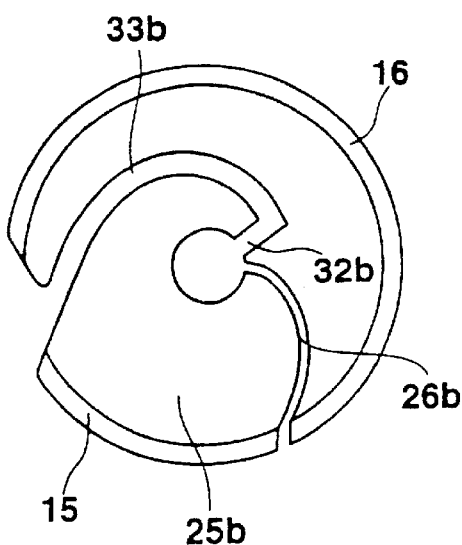
FIGS. 12 and 13 show modifications of the flux conductors of the stator.

In the exemplary embodiment of FIG. 8 ff., a modification of the top plate 14a of the stator 11a is shown. The bottom plate 14 shown in FIG. 9 corresponds to that in the first exemplary embodiment. In the top plate 14a, as shown in FIG. 10, the gap 26a, which has the magnetic-field-sensitive element 30, is curved in the direction of rotation of the rotor 12. Since the direction of rotation is clockwise, the gap 26a is curved in the clockwise direction. The gap 27a that prevents magnetic flux also, in FIG. 10, has a radially embodied region 32a and a curved region 33a. Because of the shape of the gap 26, which is curved in the direction of rotation, the permanent magnet 21, as shown in FIG. 11, can have a smaller angular range than the angular range to be measured; for instance, for a measurement angle of 240°, a permanent magnet 21a with an angular range of 170° would be the result. The permanent magnet 21a also has the same thickness over its entire length. Between the gap 26a and the permanent magnet 21a, for each angular segment to be characterized and on the assumption of a constant thickness of the permanent magnet, the same area of the permanent magnet 21a must be displaced under the segment 24a or the segment 25a, as applicable. Since in the outer radius of the permanent magnet 21a the change in area is greater than in the region of the inner radius of the permanent magnet 21a, the gap 26a must be disposed in such a way that it is curved in the rotary motion of the rotor 12. Because the permanent magnet 21a is smaller than the angle of rotation, and because the permanent magnet 21a is embodied in spiral or curved form, the two segments 24a and 25a can be nested in one another in such a way that an angle of rotation of virtually 360° can be detected with a linear measurement signal, without any change of sign. A corresponding view is shown in FIG. 12. Here, the segment 25b has a nearly heart-shaped embodiment.

In FIG. 12, the shaft 11 has an angle of rotation of 300°, for example. This requires a magnet with an angular range of 210°. The air gap 26b would then have to be curved for a distance of 88°. The width of the region 32b of the gap 27b is determined by the width of the permanent magnet 21. The curvature of the portion 33b of the gap 27b should also be adapted to the outer contour and the curvature of the permanent magnet.

Figure 13:
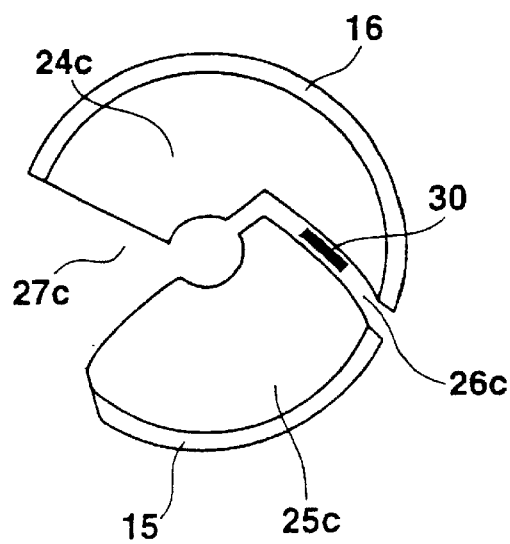

In FIG. 13, a modification of the top plate is shown that is intended to detect a smaller angular range. The advantage of this arrangement is that the two segments 24c and 25c need not be symmetrical. It is also possible, unlike the above exemplary embodiments, for the shaft 19 not to have to engage the center point of the sensor 10 or carrier plate 20. Here again, it is essential that the gap 27b be embodied between the segments 24c and 25c in such a way that it is not overtaken by the permanent magnet 21a and that only a relatively very slight magnetic flux across the gap 27c is possible. Once again, the gap 27c need not comprise air; it could also be of any other magnetically nonconductive material that accordingly prevents the magnetic flux.

What is claimed is:

1. A measuring device for contactless determination of an angle of rotation between a stator and a rotor in which an air gap is located between the stator and the rotor arranged in two planes and at least one air gap is embodied in the stator, the measuring device comprising at least one magnetic-field-sensitive element located in said at least one air gap in the stator; at least one segment of at least one permanent magnet disposed in the rotor so that a direction of polarization of the permanent magnet is oriented in an axial direction of the rotor, the stator being constructed of multiple parts at least one of which parts has no magnetically conductive connection with the other parts, said permanent magnet being formed at a maximum measurement signal it is located under only a first part of the stator, and at another maximum measurement signal it is located only under a second part of the stator.

2. A measuring device as defined in claim 1, wherein the permanent magnet has one end which is wider than another end, and a continuous transition between the ends.

3. A measuring device as defined in claim 1, wherein the permanent magnet in a continuously linearly extending development of one long side r, with the other long side R corresponding to an equation:

$$R(\alpha) = \sqrt{\left(\frac{\Delta A \cdot 360°}{\Delta(\alpha) \cdot \pi}\right) + r^2}$$

wherein A is a surface area of the permanent magnet and $\alpha$ is an angle of rotation.

4. A measuring device as defined in claim 1, wherein the permanent magnet extends over an angle which is equivalent to at least a maximum angle to be determined.

5. A measuring device as defined in claim 1, wherein the gap in which the magnetic-field-sensitive element is located is curved in a direction of rotation of the rotor.

6. A measuring device as defined in claim 1, wherein the permanent magnet is curved and is approximately of a same thickness over its entire length.

7. A measuring device as defined in claim 1, wherein the gap has a straight, radial extending portion and a curved portion adjoining the latter.

8. A measuring device as defined in claim 7, wherein the permanent magnet has a wider end, the straight portion of the gap is at least as long as the wider end of the permanent magnet.

9. A measuring device as defined in claim 1, wherein said permanent magnet extends over the first part and the second part approximately the same.

10. A measuring device as defined in claim 1, wherein the gap in which at least one segment of at least one permanent magnet is located is larger than at least one air gap where at least one magnetic-field-sensitive element is located, so that virtually narrow magnetic flux of a magnetic field generated by the permanent magnet extends across the first mentioned gap.

11. A measuring device as defined in claim 1, wherein the permanent magnet has a spiral form.

12. A measuring device as defined in claim 1, wherein the permanent magnet has a curved form.

13. A measuring device as defined in claim 1, wherein the gap in which the magnetic-field-sensitive element is located extends radially.

* * * * *